April 5, 1938.  P. A. SCOTT-IVERSEN  2,113,479
EPICYCLIC TRANSMISSION GEAR
Filed May 26, 1934
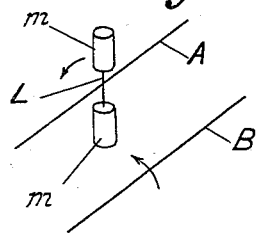
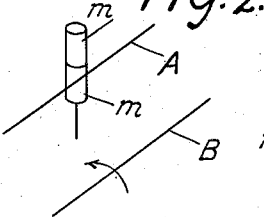
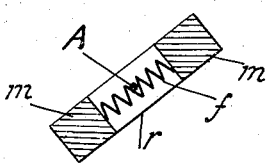
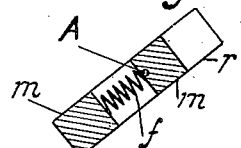
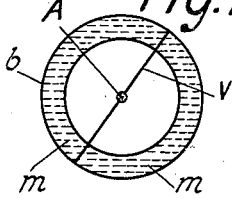
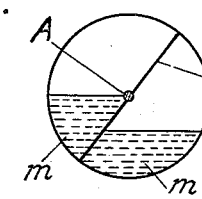
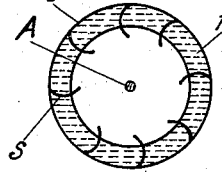
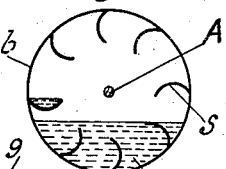
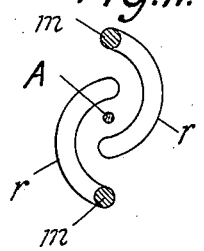
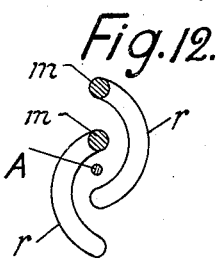
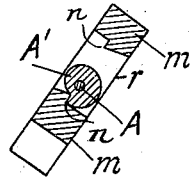
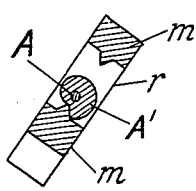
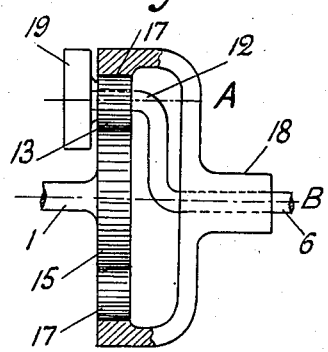
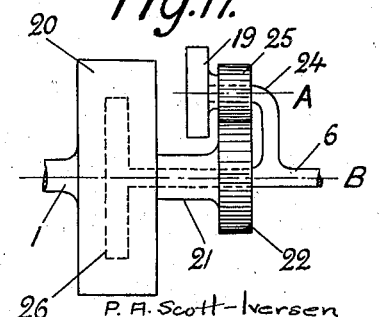
P. A. Scott-Iversen
INVENTOR
By Marks & Clerk
Attys.

Patented Apr. 5, 1938

2,113,479

UNITED STATES PATENT OFFICE 2,113,479

EPICYCLIC TRANSMISSION GEAR

Poul Arne Scott-Iversen, Copenhagen, Denmark

Application May 26, 1934, Serial No. 727,830
In Germany June 1, 1933

15 Claims. (Cl. 74—260)

My invention is concerned with a method and means by which a shaft or body rotating not only about its own axis but also about another axis is so affected that its rotation about the first-mentioned axis is braked or prevented.

My invention is based on the perception that a mass portion connected with the said shaft or body is affected, owing to its double rotation, by several forces, namely, first the centrifugal force from its rotation about the first axis, secondly the centrifugal force from the rotation about the other axis, and thirdly an additional force generally called Coriolis force, and that the mutual relation between the said forces, which try at most moments during the rotation to move the mass portion in mutually differing directions, vary both with the absolute value of the two velocities of rotation and with their mutual ratio.

According to the invention the shaft or body or the like is provided with one or more displaceable mass portions adapted to assume under the influence of centrifugal force due to the rotation about the first axis a position or positions allowing completely free rotation about the first axis, and furthermore adapted to assume under the influence of a certain centrifugal force due to the rotation about the second axis a position or positions in which its centre of gravity or their mean centre of gravity is so far from the first mentioned axis that the centrifugal force due to the rotation about the second axis prevents rotation about the first axis, the mass portion or portions and therewith the shaft or body or the like being adapted to be held in the last mentioned manner either by centrifugal force alone or by means of (or assisted by) particular locking means.

The mass portions in question are movably or yieldably connected with the shaft or body, and their mobility in relation to the said shaft or body may be more or less fixedly controlled. The mass portions may be influenced by springs or the like or by particular locking means limiting their liberty of motion wholly or partly. The mass portions may consist either of solid bodies, e. g. ball shaped bodies or blocks, or they may be liquid or consist of pulverulent materials.

The method of affecting or abrogating the prevention of a rotary movement by means of a device of the above kind consists in that the velocities of rotation about the two axes or the ratio between these velocities are or is altered in such a way that either the influence of the centrifugal force due to the rotation about the second axis or the influence of centrifugal force due to the rotation about the first axis on the mass portions connected with the shaft or body becomes preponderating so as to make the said mass portions assume the abovementioned position or positions.

The invention may be utilized within a multitude of various domains of technics, but I shall here mention only one single example of its use in order to explain its principle and manner of action, namely its use in connection with couplings, transmissions or gears which may be made semiautomatic in a simple way by means of the invention. Embodiments of such couplings or gears will be further explained below in connection with the drawing.

Figs. 1 and 2 show diagrammatically an arrangement of the mass portions relatively to the axes of rotation and in two different positions.

Figs. 3 and 4 are also diagrammatic views of an embodiment of a device having two movable mass portions and represented in two different positions.

Figs. 5 and 6 show in a corresponding way another constructional form,

Figs. 7 and 8 a second constructional form, in which the mass portion consists of a powder or liquid, Figs. 9 and 10 a third constructional form of a similar kind as that shown in Figs. 7 and 8, Figs. 11 and 12 a fourth constructional form, Figs. 13 and 14 two different constructional forms of a mass portion mechanism with locking means, Figs. 15 and 16 also diagrammatically two different constructional forms of a gear according to the invention in side elevations and Fig. 17 in a corresponding way a constructional form of a gearing with a hydraulic coupling and a device according to the invention.

Referring now to Figs. 1 and 2, A is the axis about which the body, not shown, provided with mass portions $m$ rotates, while B is another axis of rotation about which the axis A rotates. The mass portions $m$ are slidably mounted along a line L forming an angle with the axis A, e. g. perpendicular thereto, the masses being e. g. mounted on a rod placed in a form on the end of the shaft or body as illustrated in Fig. 15. The axis B is shown as being parallel with the axis A, but it may also form an angle therewith.

As long as the velocity of rotation of the body about the axis A has a certain value in relation to its velocity of rotation about the axis B the mass portions $m$ owing to the centrifugal force from the first mentioned rotation will be in the position shown in Fig. 1. If, however, the velocity of the last-mentioned rotation is increased or the velocity of the first mentioned rotation is diminished beyond a certain degree, the centrifugal force from the rotation about the axis B will become preponderating and force both of the mass portions m to assume positions as far as possible from the axis B viz to the position shown in Fig. 2, in which they are retained by the centrifugal force, due to the rotation about the axis B, so that in other words the rotation about the axis A is caused to cease and rotation will only take place about the axis B.

According to Figs. 3 and 4 two mass portions m are slidably mounted in a guide r, i. e. an embodiment similar to that of Figs. 1 and 2, but between the two mass portions m is inserted a spring f trying to keep the mass portions at the ends of the guide, so that a greater centrifugal force from the rotation about the axis B, depending on the force of the spring, is required to cause the mass portions to assume the position shown in Fig. 4, where the spring f is compressed.

In the embodiment shown in Figs. 5 and 6 the device is constructed in a similar way as a pendulum governor, the mass portions m being located at the ends of levers a pivotally connected with the shaft or body in its axis of rotation A, so that when rotating about the same they will swing out to both sides of the axis as shown in Fig. 5, whereby the amplitude of their oscillation may be suitably limited by stops, springs or the like. In Fig. 6 the rotation about the axis A is supposed to have ceased, both levers a being swung out to their outmost positions in relation to the axis B owing to the centrifugal force from the rotation about this axis.

According to Figs. 7 and 8 the device consists of a cylindrical container b divided by a partition v into two compartments each containing a suitable quantity of a liquid or a powder. The rotation about the axis A keeps the liquid or pulverulent mass portions m pressed against the periphery of the container, evenly distributed along the same as shown in Fig. 7. If, however, the centrifugal force from the rotation about the axis B is increased beyond a certain limit, the liquid or powder will tend toward one side of the container b and the rotation about the axis A will cease finally, the mass portions assuming the position shown in Fig. 8.

The constructional form shown in Figs. 9 and 10 corresponds to that of Figs. 7 and 8 with the difference that the partition is replaced by blades s or the like along the inner periphery of the container b.

The embodiment shown in Figs. 11 and 12 is of a similar kind to those shown in Figs. 3 and 4, but comprises two curved guides r in which the mass portions m, which may e. g. consist of balls, are able to move. In order to avoid too heavy thrusts when the balls meet the ends of the guides, these may be lined with a suitable elastic material or be provided with springs (not shown).

According to Fig. 13 the mass portions m are provided with projections or noses n coacting with a corresponding recess in the shaft $A_1$, so that the guide r with the mass portions m is directly prevented from rotating about the axis A when a mass portion m engages the said recess.

The constructional form according to Fig. 14 differs from that shown in Fig. 13 only thereby that the active surface of the projections n is inclined, so that a wedge action is obtained at their engagement with the shaft $A_1$.

The above specified and illustrated embodiments of the arrangement of the mass portions are only some scattered examples among the countless ways in which the device may be constructed.

In the constructional form of a gearing shown in Fig. 15, 1 is the driving shaft. This shaft has a crank-like bend 2 carrying two freely rotatable gear wheels 3, 4 rigidly connected with each other. The gear wheel 3 meshes with a gear wheel 5 rigidly mounted on the driven shaft 6. Loosely mounted thereon is a sleeve 8 carrying a gear wheel 7 meshing with the gear wheel 4. The sleeve 8, and therewith also the gear wheel 7, is prevented from running in one direction of rotation by a pawl or free wheel mechanism (not shown), while it is free to rotate in the opposite direction. Rigidly connected with the hub of the gear wheel 4 is a fork 9 or the like carrying the mass portion device, e. g. as shown cylindrical bodies m sliding on a rod 10.

The action is as follows:—

When the shaft 1 is rotated, the gear wheel 4 tries to rotate the gear wheel 7 in the direction in which it cannot rotate and, consequently, the gear wheel 4 will roll on the said gear wheel 7. As the gear wheel 3 is rigidly connected with the gear wheel 4 and has a number of teeth differing from that of the gear wheel 4, the gear wheel 3 causes the gear wheel 5 and, therewith, the shaft 6 to rotate in the same direction as the shaft 1, but with a lower speed than this shaft. If under these conditions the speed is accelerated, the mass portions m will remain in their positions shown in Fig. 15, so that they do not make any resistance to the rotation of the gear wheels 3, 4 about the axis A of the bend 2.

If, however, the acceleration of the shaft 1 ceases and its velocity of rotation is moreover diminished, while the velocity of rotation of the shaft 6 is in all essentials maintained as a result of the inertia of the masses connected with this shaft (e. g. in an automobile gearing owing to the inertia of the mass of the carriage), the centrifugal force acting on the mass portions m from the rotation about the axis B of the shafts 1, 6 will preponderate, and finally the rotation about the axis A is caused to cease, i. e. the shafts 1 and 6 will rotate with the same velocity, as owing to the said centrifugal force the mass portions m are permanently kept in their flung-out positions (see Fig. 2) so as to prevent rotation about the axis A. Thus the gear wheel 3 acts now direct as a driver for the gear wheel 5, and at the same time the gear wheel 4 will carry along the gear wheel 7 and the sleeve 8 in the common rotation about the axis B, the free wheel mechanism of the sleeve 8 allowing just such a rotation. The driving shaft 1 is now again allowed to be accelerated without the gearing shifting to the original lower ratio, as the centrifugal force acting on the mass portions m will be able to retain the gear wheels 3, 4 even against a rather high momentum surge on the shaft 6.

If, however, the resistance to be overcome by the driven shaft surpasses a certain value (e. g. if the automobile has to force a steep hill and the speed of the engine decreases at the same time), the centrifugal force will become too small as compared with the momentum of reaction acting to rotate the gear wheel 3 about the axis A, and then this gear wheel will rotate about the said axis together with the gear wheel 4 and the device 9, 10, whereby the mass portions m will again assume their positions according to Fig. 15 and the gearing works again as originally with the lower ratio of transmission until the value of the momentum to be overcome allows again the shifting to direct transmission as above described.

Instead of a single pair of gear wheels 3, 4 with appurtenant arrangement of the mass portions several such pairs may advantageously be used, as e. g. three pairs with a mutual distance of 120°.

The same relates to the constructional form represented in Fig. 16. Here 1 is the driving shaft on which is rigidly mounted a gear wheel 15 meshing with one or more planet pinions 13 freely rotatably mounted on a crank-like bend 12 issuing from the driven shaft 6. The planet pinion 13 also meshes with inner teeth of a disc 17, the hub of which 18 is freely mounted on the shaft 6 but prevented by a free wheel mechanism from rotating in more than one direction. The planet wheel 13 is rigidly connected with a flat cylindrical casing 19 containing the mass portions.

The action of this device is similar to the above described one. When the shaft 1 rotates, the planet pinion 13 is carried along by the gear wheel 15 and rolls on the teeth of the disc 17, which is retained by the free wheel mechanism, and the shaft 6 gets a velocity of rotation which is lower than that of the shaft 1. In a similar manner as described above the mass portion device may be put into action, so that the rotation of the planet pinion 13 about the axis A of the bend 12 is caused to cease and the gear wheel 15 carries direct along the wheel 13 and shaft 6, the disc 17 being also taken along in the rotation.

In Fig. 17 1 is also the driving shaft carrying here the outer part of a hydraulic coupling, e. g. a Föttinger coupling. The part 20 is rigidly connected by a hub 21 with a gear wheel 22 meshing with a planet pinion 25 loosely mounted on a crank-like bend 24 issuing from the driven shaft 6. This shaft is led freely through the gear wheel 22 and hub 21 and carries on its end the inner part 26 of the hydraulic coupling. The mass portion device 19 is rigidly connected with the planet pinion 25.

The coupling may be employed as an ordinary hydraulic coupling, e. g. in automobiles and turbines, and it has the advantage that it is able to give direct transmission, as the shaft 6 will be carried along direct by the shaft 1 through the gear wheels 22, 25, when the last mentioned wheel is prevented at certain speeds by means of the device 19 from rotating about the axis A of the bend 24.

The above described and illustrated possibilities of employing the invention are, as already stated, only cited by way of examples to explain the principle of the invention, as the subject matter of the invention may be utilized also within other territories of the technics, and couplings of the illustrated and described kind may be constructed in many other ways than here described. Contingently two or more couplings of the described kind may be coupled in series, whereby it becomes possible to get a greater number of ratios of transmission.

I claim:

1. Epicyclic transmission gear, comprising a driving and a driven shaft, a sun gear rotatable with one of said shafts about a main axis of the transmission gear, a planetary gearing rotatable with the other shaft of the transmission gear and intermeshing with the sun gear, mass portions displaceably connected to the planetary gear wheels, said mass portions being displaceable, under influence of the centrifugal forces affecting them, from the one to the other of two extreme positions, each corresponding to one definite gear ratio, viz. one position in which they are mutually balanced, i. e. that the center of gravity of the planetary gear wheel with mass portions is in the axis of rotation of said gear wheel, and another position in which said center of gravity is so far from said axis that the centrifugal force due to the rotation about the main axis prevents the rotation of the planetary wheel about its own axis, and means for allowing the transmission of power not only in the latter position but also in the first mentioned position of the mass portions.

2. Epicyclic transmission gear according to claim 1, comprising particular locking means for facilitating the holding of the mass portions and therewith the planetary gear wheels in the positions in which rotation about their own axes is prevented.

3. Epicyclic transmission gear comprising a driving and a driven shaft, a sun gear rotatable with one of said shafts about a main axis of the transmission gear, a further gear loosely mounted in relation to the said shafts, means for preventing said further gear from rotating in one direction, but allowing free rotation in the opposite direction, a planetary gearing rotatable with the other shaft of the transmission gear, mass portions displaceably connected to the planetary gear wheels, said mass portions being displaceable, under influence of the centrifugal forces affecting them, from the one to the other of two extreme positions, each corresponding to one definite gear ratio, viz. one position in which they are mutually balanced, i. e. that the center of gravity of the planetary gear wheel with mass portions is in the axis of rotation of said gear wheel, and another position in which said center of gravity is so far from said axis that the centrifugal force due to the rotation about the main axis prevents the rotation of the planetary wheel about its own axis, said planetary gearing intermeshing both with said sun gear and with said further gear, thereby rendering the transmission of power possible not only when the planetary gear wheels are prevented from rotating about their own axes, but also when they may rotate freely about their own axes.

4. Epicyclic transmission gear, comprising a driving and a driven shaft, a hydraulic coupling, one part of which is rotatable with one of said shafts, a sun gear rotatable with the other part of said hydraulic coupling, a planetary gearing rotatable with the other shaft of the transmission gear and intermeshing with the sun gear, mass portions being displaceably connected to the planetary gear wheels, said mass portions displaceable, under influence of the centrifugal forces affecting them, from the one to the other of two extreme positions, each corresponding to one definite gear ratio, viz. one position in which they are mutually balanced, i. e. that the center of gravity of the planetary gear wheel with mass portions is in the axis of rotation of said gear wheel, and another position in which said center of gravity is so far from said axis that the centrifugal force due to the rotation about the main axis prevents the rotation of the planetary wheel about its own axis, so that transmission of power and motion from the driving to the driven shaft may take place either through the hydraulic coupling, while the planetary gear wheels roll on the sun gear, or, when the planetary gear wheels are prevented from rotating about their own axes by direct drive.

5. Epicyclic transmission gear according to claim 1, in which the mass portions are yieldably connected with the planetary gear wheel.

6. Epicyclic transmission gear according to claim 1, in which the mass portions are movably connected with the planetary gear wheel, means being provided for limiting the free mobility of the mass portions.

7. Epicyclic transmission gear according to claim 1, in which the mass portions are movably connected with the planetary gear wheel, means being provided for guiding the motions of the mass portions relatively to the planetary gear wheel.

8. Epicyclic transmission gear according to claim 1, in which the mass portions consist of solid bodies.

9. Epicyclic transmission gear according to claim 3, in which the planetary gearing consists of two adjacent sets of gear wheels (3 and 4), each gear wheel in the one set (3) being connected with one gear wheel of the other set (4) so that two such gear wheels (3 and 4) will rotate simultaneously and about the same axis, the gear wheels of the one set (3) intermeshing with the said sun gear (5) while the other set (4) intermeshes with said further loosely mounted gear (8).

10. Epicyclic transmission gear, comprising a driving and a driven shaft, a sun gear rotatable with one of said shafts about a main axis of the transmission gear, a planetary gearing rotatable with the other shaft of the transmission gear and intermeshing with the sun gear, containers connected to the planetary gear wheels and containing liquid masses being displaceable within the containers under influence of the centrifugal forces affecting them from the one to the other of two different placings, each corresponding to one definite gear ratio, namely, one placing in which the liquid masses are mutually balanced, that is where the center of gravity of the planetary gear wheel with the liquid masses is in the axis of rotation of said gear wheel, and another placing in which said center of gravity is so far from said axis that the centrifugal force due to the rotation about the main axis prevents the rotation of the planetary wheel about its own axis, and means for allowing the transmissions of power not only in the latter position but also in the first mentioned position of the liquid masses.

11. Epicyclic transmission gear, comprising a driving and a driven shaft, a sun gear rotatable with one of said shafts about a main axis of the transmission gear, a further gear loosely mounted in relation to said shafts, means for preventing said further gear from rotating in one direction, but allowing free rotation in the opposite direction, a planetary gearing rotatable with the other shaft of the transmission gear, containers connected to the planetary gear wheels and containing liquid masses being displaceable within the containers under influence of the centrifugal forces affecting them from the one to the other of two different placings, each corresponding to one definite gear ratio, namely, one placing in which the liquid masses are mutually balanced, that is where the center of gravity of the planetary gear wheel with the liquid masses is in the axis of rotation of said gear wheel, and another placing in which said center of gravity is so far from said axis that the centrifugal force due to the rotation about the main axis prevents the rotation of the planetary wheel about its own axis, said planetary gearing intermeshing both with said sun gear and with said further gear, thereby rendering transmission of power possible not only when the planetary gear wheels are prevented from rotating about their own axes, but also when they may rotate freely about their own axes.

12. Epicyclic transmission gear according to claim 10 with the modification that pulverulent masses are used instead of liquid masses.

13. Epicyclic transmission gear according to claim 10 with the modification that granulated masses are used instead of liquid masses.

14. Epicyclic transmission gear according to claim 11 with the modification that pulverulent masses are used instead of liquid masses.

15. Epicyclic transmission gear according to claim 11 with the modification that granulated masses are used instead of liquid masses.

POUL ARNE SCOTT-IVERSEN.